(12) United States Patent
Murphy, Jr. et al.

(10) Patent No.: US 8,171,088 B2
(45) Date of Patent: May 1, 2012

(54) FACILITATING CORRECTION OF INCORRECT IDENTITIES IN PROPAGATED ELECTRONIC COMMUNICATIONS

(75) Inventors: Thomas E. Murphy, Jr., Hopewell Junction, NY (US); Francis A. Pflug, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 12/134,242

(22) Filed: Jun. 6, 2008

(65) Prior Publication Data

US 2009/0307315 A1 Dec. 10, 2009

(51) Int. Cl.
*G06F 15/16* (2006.01)
(52) U.S. Cl. ......... 709/206; 709/204; 709/205; 709/207
(58) Field of Classification Search .......... 709/204, 709/205, 206, 207
See application file for complete search history.

(56) References Cited

U.S. PATENT DOCUMENTS

| | | | |
|---|---|---|---|
| 6,564,264 B1 | 5/2003 | Creswell et al. | |
| 6,684,238 B1 | 1/2004 | Dutta | |
| 7,337,448 B1 | 2/2008 | Dalia et al. | |
| 7,430,580 B2 | 9/2008 | Baratakke et al. | |
| 2002/0023181 A1* | 2/2002 | Brown et al. ............ | 710/8 |
| 2002/0042815 A1 | 4/2002 | Salzfass et al. | |
| 2002/0087647 A1 | 7/2002 | Quine et al. | |
| 2002/0143879 A1 | 10/2002 | Sommerer | |
| 2002/0188683 A1 | 12/2002 | Lytle et al. | |
| 2003/0110223 A1 | 6/2003 | Hamilton et al. | |
| 2003/0135567 A1* | 7/2003 | Reilly ..................... | 709/206 |
| 2004/0181586 A1 | 9/2004 | Morreale et al. | |
| 2004/0215726 A1 | 10/2004 | Arning et al. | |
| 2004/0249951 A1 | 12/2004 | Grabelsky et al. | |
| 2005/0278430 A1* | 12/2005 | Cato ....................... | 709/206 |
| 2006/0031772 A1 | 2/2006 | Valeski | |
| 2007/0050456 A1 | 3/2007 | Vuong et al. | |
| 2007/0106731 A1* | 5/2007 | Bhakta et al. .......... | 709/206 |
| 2007/0124394 A1* | 5/2007 | Farrell et al. .......... | 709/206 |
| 2008/0021962 A1 | 1/2008 | Ryan et al. | |
| 2008/0040432 A1 | 2/2008 | Murphy et al. | |
| 2008/0071867 A1 | 3/2008 | Pearson et al. | |
| 2008/0104075 A1 | 5/2008 | Heumesser | |
| 2008/0104190 A1 | 5/2008 | Morreale et al. | |
| 2008/0133677 A1 | 6/2008 | Pattabhiraman et al. | |
| 2008/0168373 A1 | 7/2008 | Wilson | |

(Continued)

OTHER PUBLICATIONS

Network Working Group Request for Comments 2822, P. Resnick, Apr. 2001.

(Continued)

*Primary Examiner* — Carl Colin
*Assistant Examiner* — Harunur Rashid
(74) *Attorney, Agent, or Firm* — William A. Kinnaman, Esq.; Kevin P. Radigan, Esq.; Heslin Rothenberg Farley & Mesiti P.C.

(57) ABSTRACT

An electronic communication is sent from a first tier sender to a first tier of one or more recipients. A first tier recipient propagates the communication to a second tier of one or more recipients. The first tier sender determines that the communication includes an incorrect identity. The first tier sender notifies the first tier recipients of the error and of the corrected identity. Responsive thereto, the first tier recipients send corrections to selected second tier recipients.

18 Claims, 7 Drawing Sheets

U.S. PATENT DOCUMENTS

| | | |
|---|---|---|
| 2008/0301454 A1 | 12/2008 | Malcolm et al. |
| 2009/0089382 A1 | 4/2009 | Garrett |
| 2009/0094335 A1 | 4/2009 | Edmonds et al. |
| 2009/0132664 A1 | 5/2009 | Radenkovic et al. |
| 2009/0182824 A1 | 7/2009 | Haynes et al. |
| 2009/0240657 A1 | 9/2009 | Grigsby et al. |

OTHER PUBLICATIONS

Office Action for U.S. Serial 12/134,238 dated Jun. 6, 2008.
Moore, K., G. Vaudreuil, "Network Working Group Request for Comments 3464", Jan. 2003.
Office Action for U.S. Appl. No. 12/134,248 dated Jun. 8, 2010.
Office Action for U.S. Appl. No. 12/134,246 dated May 10, 2010.
Final Office Action for U.S. Appl. No. 12/134,246 dated Oct. 25, 2010.
Final Office Action for U.S. Appl. No. 12/134,248 dated Dec. 2, 2010.
Final Office Action for U.S. Appl. No. 12/134,238 dated Mar. 3, 2011.
Office Action for U.S. Appl. No. 12/134,248 dated Mar. 15, 2011.
Essenmacher et al., Office Action for U.S. Appl. No. 12/134,238 (U.S. Patent Publication No. 2009/0307271 A1), dated Feb. 1, 2012.

\* cited by examiner

202 — To: Mary Smith <mary@example.net>, Jack Smith<jack@example.net>, John Brown<jbrown@nowheres.org>

204 — cc: John Doe<doej@example.net>, Lisa Riley<lriley@somewhere.org>, Fred Blue<fblue@example.net>, Steve Wolf<swolf@anywhere.net>

206 — bcc:

208 — Subject: New Security Exploit

210 — Body of Message

FIG. 2

Delivery Failure Report

Your document:     Example of incorrectly addressed Email to one of several recipients
was not delivered to:  <wrong_id@charter.net>
because:           Message delivery has failed for an unknown reason.

What should you do ?
- You can resend the undeliverable document to the recipients listed above by choosing the Resend button or the Resend command on the actions menu.
- Once you have resent the document you may delete this Delivery Failure Report.
- If resending the document is not successful you will receive a new failure report.
  Unless you receive other Delivery Failure Reports, the document was successfully delivered to all other recipients.

▲ | Routing path |

310 ⌒ To: | wrong_id@charter.net |

320 ⌒ cc: | Thomas Murphy Jr/Endicott/IBM@IBMUS, Francis Pflug/Endicott/IBM@IBMUS |

Date: | 11:32:47 AM Today |

Subject: | Example of incorrectly addressed Email to one of several recipients |

FIG. 3

502 — Resent-From: Joe Public<jpublic@charter.net>
504 — Resent-To: Mary Smith <mary@example.net>, Jack Smith <jack@example.net>, John Brown <jbrown@nowheres.org>, Bad Recipient <rightid@charter.net>
506 — Resent-Date: Mon, 24 Nov 1997 14:22:01 -0800
Resent-Message-ID: <78910@example.net>
508 — From: Joe Public <jpublic@charter.net>
To: Mary Smith <mary@example.net>, Jack Smith <jack@example.net>, John Brown <jbrown@nowheres.org>, Bad recipient <wrongid@charter.net>
510 — X-Updated-Recipent: badrecipients = <wrongid@charter.net>, correctrecipients = <rightid@charter.net>;
Subject: Updated Recipient: Re: New Security Exploit
Date: Fri, 21 Nov 1997 09:55:06 -0600
Message-ID: <1234@local.machine.example>

FIG. 5

FACILITATING CORRECTION OF INCORRECT IDENTITIES IN PROPAGATED ELECTRONIC COMMUNICATIONS

TECHNICAL FIELD

This invention relates, in general, to electronic communications, and in particular, to facilitating correction of incorrect identities in electronic communications that have been propagated by recipients of the communications.

BACKGROUND OF THE INVENTION

There are various modes of communication used today, including telephonic communication, facsimile communication, and electronic communication, as examples. In recent years, electronic communication has become a preferred medium of communication for many businesses and individuals. Electronic communication includes electronic mail, also known as email or e-mail, and instant messaging, as examples. The preference for electronic communication stems from the many advantages that are provided by this mode of communication. People have always wanted to correspond with one another in the fastest way possible. Electronic mail is advantageous over regular mail in this respect as it provides a near instantaneous form of communication. Prior to e-mail, first telegraph, and then later facsimile, provided similar instantaneous forms of communication, but in both instances, the steps leading to sending and then ultimately steps involved in receiving this instant communication were burdensome. By contrast, once means of communication is established, electronic mail or other electronic communications do not provide any additional burdens either for the sender sending the communication or the receiver receiving the communication.

In many instances, electronic communication is taking the place of the telephone or is even preferred to it. While affording the same ease and instantaneous means of communication as a telephone, electronic communication is preferred in instances where there is an advantage to recording the communication. For example, documentation of communications may be required or at least preferred in instances where such documentation provides legal protection to one or both parties. But, even in situations where such documentation is not necessary, written documentation affords better information retention. For example, it may be easier to organize and retain information about a client's new address and phone number when such information is provided by stored electronic means that can be easily retrieved, as opposed to other means that can be more easily misplaced.

The popularity of electronic communication has led both individuals and businesses to rely heavily on this form of communication. Electronic communication allows people to write back and forth without having to spend much time worrying about how the message actually gets delivered. As technology grows closer and closer to being a common part of daily life, the reliance of both individuals and businesses on this medium of communication is sharply increasing.

Electronic communications rely on addresses to send/receive messages. For instance, an e-mail address provides the information required to get a message to a user or businesses anywhere around the world. Other forms of electronic communications, as well as other forms of communication, also rely on addresses or other forms of identity.

Unfortunately, there are instances where the message contained in a communication is not delivered to the intended recipient because the identity (e.g., address) is incorrect. When an identity is incorrect, the intended recipient of the communication does not receive the communication. This is troublesome for the original sender of the communication, as well as to others that may be relying on that communication, such as those carbon copied in the cc:, blind carbon copied in the bcc:, or other recipients in the to: header.

Often, the sender of the message is notified of the failure to deliver by a delivery error message. However, this message is only sent to the actual originator of the communication. Therefore, none of the successfully addressed recipients of the communication are notified of the occurrence of an error until attempting to initiate subsequent responses to the original message that often use the same distribution lists of recipients having the same embedded incorrect information. As more and more users get involved and more responses are generated, the error further compounds as it is duplicated each time, leading to the cascading of incorrect e-mail addresses and information that were originated at an earlier stage from a single source.

The error and associated lost productivity become a permanent attribute in any later communication that uses the erroneous e-mail address or identity.

SUMMARY OF THE INVENTION

Based on the foregoing, a need exists for a capability that determines that a communication with an incorrect identity has been propagated, chases the propagation and provides the corrected identity.

The shortcomings of the prior art are overcome and additional advantages are provided through the provision of a computer-implemented method to facilitate correction of electronic communications. The method includes, for instance, determining by a recipient of an electronic communication that the electronic communication, which has an incorrect identity, has been propagated to one or more other recipients; and providing, by the recipient to at least one recipient of the one or more other recipients, a corrected identity for the incorrect identity.

Systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts one example of a communication to be sent to a plurality of receivers, in accordance with an aspect of the present invention;

FIG. 3 depicts one example of a snap-shot of a delivery failure message returned to a sender of an electronic communication, in accordance with an aspect of the present invention;

FIG. 5 depicts one example of a corrective communication, in accordance with an aspect of the present invention;

DETAILED DESCRIPTION OF THE INVENTION

In accordance with an aspect of the present invention, a capability is provided that determines that a communication having one or more incorrect identities has been propagated and that facilitates correction of the incorrect identities, such that further propagation of the communication includes corrected identities. As used herein, an identity is any type of information that indicates where a communication is to be sent or otherwise identifies how to locate a user, including, but not limited to, an e-mail address, a buddy indication, an indication stored in a phone directory, or other types of addresses used in communication.

Figure 1:
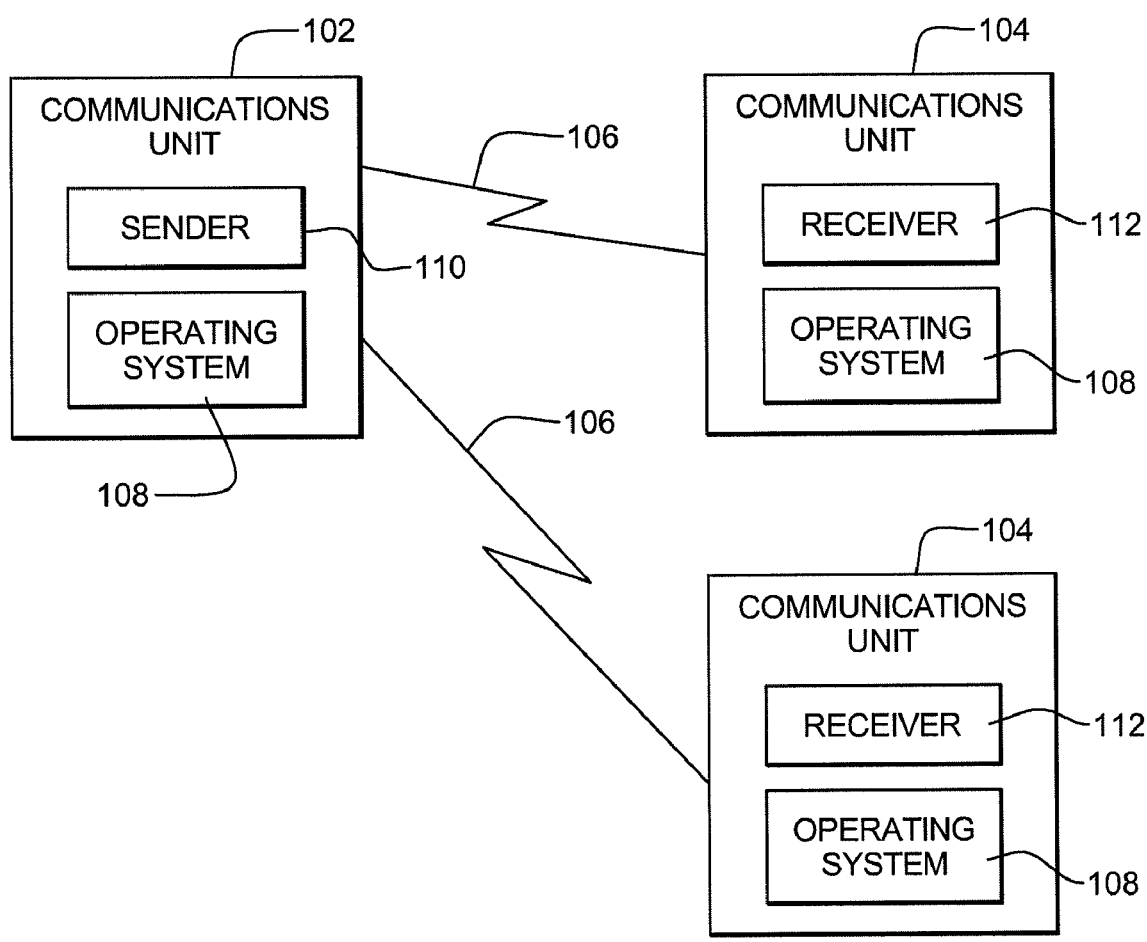
FIG. 1 depicts one example of a communications environment to incorporate and use one or more aspects of the present invention.

One embodiment of a communications environment to incorporate and use one or more aspects of the present invention is described with reference to FIG. 1. A communications environment 100 may include, for instance, a communications unit 102 coupled to a plurality of other communications units 104 via one or more connections 106. A communications unit may include, for instance, a personal computer, a laptop, a handheld unit, a workstation, a mainframe, a mini computer, a node or any other type of unit capable of sending and/or receiving e-mails or other communications. Communications unit 102 may or may not be the same type of communications unit as communications units 104. Additionally, each of communications units 104 may or may not be the same type of unit as another communications unit 104. The connections coupling the units are, for instance, any type of network connection, such as an internet connection; a local area network (LAN); a wide area network (WAN); a token ring; an Ethernet connection, etc.

Each communications unit 102, 104 executes, for example, an operating system 108, such as, for instance, AIX®, offered by International Business Machines Corporation, Armonk, N.Y.; Linux; Windows®; or other operating systems, etc. (AIX® and IBM® are registered trademarks of International Business Machines Corporation, Armonk, N.Y., U.S.A. Windows® is a registered trademark of Microsoft Corporation, Redmond, Wash. Other names used herein may be registered trademarks, trademarks or product names of International Business Machines Corporation or other companies.) The operating system of one communications unit may be the same or different from another communications unit. Further, in other examples, one or more of the communications units may not include an operating system. Although three (3) communications units are depicted in FIG. 1, more or less units may be included. In one example, communications unit 102 is communicatively coupled to a number of communications units.

Communications unit 102 includes, for instance, a sender 110, which sends communications to one or more communications units 104. In this example, each of communications units 104 includes a receiver 112 that receives and may respond to the communications received from sender 110.

To communicate between a sender and a receiver, the sender prepares a communication (e.g., a note, a message, etc.) to be sent to the receiver. In one example, in which messages are sent between users within the framework of an electronic communication, a syntax is provided for these messages. One example of such a syntax is provided by a network working group Request For Comments (RFC) 2822 document, hereinafter RFC2822, from Qualcomm Inc., published April 2001, which is hereby incorporated herein by reference in its entirety.

In the context of electronic mail, RFC2822 messages are viewed as having an envelope and contents. The envelope includes whatever information is needed to accomplish transmission and delivery. The contents include the object to be delivered to the recipient. The above mentioned standard effects the format and some of the symantics of message content, but does not contain any information pertaining to the envelope. Under this standard, messages are passed by the help of header fields which have similar structures and are composed of a field name separated from a field body by a colon.

One example of a communication is depicted in FIG. 2. In this example, a communication 200 is an e-mail communication that includes a plurality of header fields, including, for instance, a To: field 202 indicating one or more identities (e.g., e-mail addresses) to which the communication is to be sent; a cc: field 204 indicating zero or more recipients that are to be carbon copied; a bcc: field 206 indicating zero or more recipients that are to be blind carbon copied; and a subject field 208, optionally indicating the subject. The communication also includes a message 210. A communication may include more, less or different information than described above. Further, although in the example described herein the communication is an e-mail and the identities are e-mail addresses, other forms of communications and/or identities can be used and benefit from one or more aspects of the present invention.

In response to sending the communication, a delivery failure report may be provided. One example of a snap-shot of a delivery failure report 300, generated when an electronic communication, such as an e-mail, has failed to reach its intended recipient, is depicted in FIG. 3. The snap-shot and the discussion that follows use the Lotus Notes® product offered by International Business Machines Corporation as an example of an electronic communication delivery service. This is just one example to facilitate understanding. The present invention is not limited to the use of Lotus Notes®. Many electronic communication, and particularly e-mail delivery, systems operate on similar concepts, and therefore, experience the same limitations and problems as discussed with reference to the Lotus Notes® example. Similarly, one or more aspects of the present invention are applicable to all such e-mail services.

Referring to FIG. 3, the communication containing the attempted message was sent by the originator of the e-mail, hereinafter referenced as the originator. The message was intended primarily for "wrong-id", whose correct e-mail domain address was at "charter.net" in this example. This information can be obtained by referencing the "TO" field denoted by numerals 310. In this example, "wrong_id" encompasses any and all types of undeliverable destination id's (e.g., misspelled, non-existent, mistyped or otherwise a wrongly entered user identity, etc. . . . ).

A list of other names also appear in the carbon copy distribution section, denoted by "cc" and referenced by numerals 320. This other field illustrates that the e-mail was also sent, as way of carbon copying, to (user id) Thomas Murphy Jr. at Endicott, whose e-mail address is at IBMUS, and to a second person, namely Francis Pflug at Endicott, whose e-mail address is also at IBMUS.

The Delivery Failure Report is only delivered back to the originator of the message. The correctly addressed recipients, in this case Thomas Murphy Jr. and Francis Pflug, who are only carbon copied do not receive or do not see the Delivery Failure Report that is sent back to the originator of the message. It should be noted that this is the case no matter in what field the names of the correctly addressed recipients appear. That is, even though in the example used, the names of Thomas Murphy Jr. and Francis Pflug happen to appear in the "cc" field, the names could have easily appeared in "To" field 310 or alternatively, on a blind carbon copy (bcc) list (not illustrated here) or any other kind of fields that may appear in conjunction with a particular e-mail delivery service. The end result would be the same. The originator of the e-mail is the only person to receive the Delivery Failure report. None of the correctly addressed recipients, included in any of the fields mentioned above, are notified that any such delivery error was made.

Similarly, it does not matter in which field the erroneous name or the name with the erroneous e-mail address appears. In the example of FIG. 3, the erroneous name/address is that of "wrong-id" and that name appears in the "To" field. In this case, the "wrong-id" is the primary party the message is intended for, with everyone else being only on the copy list. The same resultant (error notification), however, occurs if the name of the "wrong-id" is one of many possible names that occurred in "cc" field 320, along with everyone else's name and address in the same field provided with correct userid@address information. Alternatively, the name of the wrong-id could have been one of the names appearing in the bcc field or other such fields. The name of the "wrong-id" might be the only name that is incorrect, or it could be one of a few or many names with incorrect provided information.

In any such cases, the result is the same as discussed above. The originator of the message is the only one that receives Delivery Failure Report 300, and the remaining individuals (or entities) on the e-mail list are not informed that a delivery error has occurred at all. If there are more than one delivery problems because of incorrect information provided on more than one entry, then a single Delivery Failure Report or many, with each indicating a single error, may be generated and sent to the originator depending on the particular e-mail system being used.

The thought process, perhaps behind the design of many such e-mail systems and services, where the delivery failure is only reported to the originator makes much sense. It is logical to assume that the delivery of the e-mail is the responsibility of the originator of the mail and the other e-mail recipients do not want to be bothered by the delivery or lack of the delivery of the original message. This problem, however, can become increasingly more troublesome after a few iterations. While perhaps the first time that such an error surfaces as the result of the originator's erroneous address information, the error reporting may not be troublesome, if such an error is not corrected, but simply replicated, other error reports are generated and sent to senders included in the distribution list. As the problem cascades, the impact grows exponentially, with the situation leading to unnecessary cluttering of the systems and other individuals' mail.

The problem, often, occurs in a practical setting and even though originally the other recipients of the e-mail may not want to find out about the lack of delivery to one or more persons/entities stated on the originator's message, they will come to care about it as the responses from them and other such recipients start to appear. In other words, it becomes a concern when any of the correctly addressed recipients in the distribution receive the mail in their respective in-boxes and choose to "reply (or forward) to all" originally listed persons/entities in the originator's distribution list (including the malformed addressee), by simply choosing a "Reply (or Forward) All" option included with many e-mail systems, or by actual cutting and pasting or forming of a new distribution list based on what was sent.

In such cases, the person responding logically makes the assumption that all recipient addresses are correct, whereas in fact one or more of the recipients, in this case, the primary recipient has perhaps never received the original e-mail. In this manner, the problem cascades, and each time that the message is distributed further (and perhaps new persons/entities are even added), the problem duplicates itself. This is because no matter which technique is used, the cutting and pasting, the retyping, the use of the "Reply/Forward ALL" or other automated techniques that duplicate the distribution list, the information is not corrected, but is only duplicated from the original list.

In a different scenario, the originator or initiator of the communication is trying to schedule a meeting using both the e-mail and the calendaring options to find a suitable time and then sending the invitation to a group of individuals as per a user generated distribution list. The challenge will be similarly faced here by a source/initiator of this meeting notice in case a meeting time or location change is required subsequent to the initial meeting notice distribution. In this example, subsequent meeting record modifications are propagated to the meeting invitees in the distribution list. Depending on enterprise/user policies and preferences, when the recipients process the meeting invitations or updates, the later versions are reconciled by the mail client and the recipient is offered the opportunity to open the latest aggregated meeting record. Again, a delivery failure is not sent to all invited persons on the distribution list, in case of information error, but only to the originator of the meeting. However, a change request or even a counter offer uses the distribution list to generate later mail that is resent to everyone on the list, thus cascading the error.

This latter example is used to reflect that delivery problems can have much more encompassing effects and is not limited to e-mail delivery alone. Other similar problems can also arise out of this situation, as known to those skilled in the art.

Referring back to the original example discussed in conjunction with FIG. 3, in one embodiment, the originator is informed of the misaddressed e-mail and is presented an option to make corrections and resend the original e-mail. In one example, an option is provided allowing the originator to provide a corrected e-mail address and resend the undelivered e-mail to the corrected addressee. In addition, this embodiment provides for resending (propagating) the corrected addressee information to the other (original) recipients of the incorrect address as originally sent. In such an example, when the originator receives "Delivery Failure Report" 300, which can be as fast as within seconds of sending the original message, the originator then has the ability of selecting an option, such as "Resend with Propagation" or others providing such similar functions, to avoid a cascading error. The name "Resend with Propagation" obviously is an option name used by way of example here and other similar names or option functionalities may be used. The intent of the option and its function is to inform the otherwise unaware e-mail clients, that are included now or will be somewhat included during a later stage of the distribution, of the original error and the misinformation provided in the primary originated message and to tag the correction for the benefit of client software.

In the case of the example provided in conjunction with FIG. 3, this means that Thomas and Francis, who in this case are the unaware e-mail clients, are informed and the wrong address(es) in the original e-mail distribution are rectified due to the tagged correction. This may be handled in a variety of manners. Depending on which embodiment is selected, any concerns about inundating others (the non-originator of the e-mail or the recipients of an e-mail distribution list) with duplicate and unwanted mail can also be resolved.

It should also be noted that, in one embodiment, the originator of the e-mail has the option of actually selecting such a function. In other embodiments, some of which are suggested below, alternate arrangements can be provided to counter the problems discussed.

A first way of handling the resend option is already mentioned. In general, the actual handling of the information could be customized in associated configuration preferences or through a central policy administration. For example, in one embodiment, the handling of such information could be automatic. In such an embodiment, the erroneous e-mail address is corrected without intervention and appearance in the recipient's e-mail box. Thus, in the example above, both Thomas and Francis are completely unaware of the original mistake or any subsequent correction.

In an alternate embodiment, for efficiency reasons, the automatic correction may not be triggered until and unless someone in the distribution list attempts to respond to the person or entity having erroneous information. In such a case, the information is then automatically corrected with or without intervention or with or without appearance to the other recipient's e-mail. An example of this would be using the "Respond to ALL" or "Reply ALL", (Forward All), etc. . . . options included in many e-mail services and/or systems.

There are times, however, that it is not advisable for the mistake to be corrected unnoticed. As an example, if one of the persons realizes that the mail should no longer be sent to a person. For instance, as long as all persons in the distribution list have addresses that belong to company X, the e-mail should be distributed, but if the person's address is not one belonging to company X, then the person's name should be taken off of the distribution list. In such a case, an alternate embodiment can be devised. This and other similar examples provide a reason for other embodiments that enable customization. In one such an embodiment, the correction is fully exposed in the in-boxes of one or more of the persons included in the distribution list for full awareness and/or manual correction. As before, this option can be triggered initially upon the onset of realization of erroneous information (upon sending of the original message), or triggered later when one or more individuals try to respond to the e-mail or other such similar circumstances.

Figure 4:
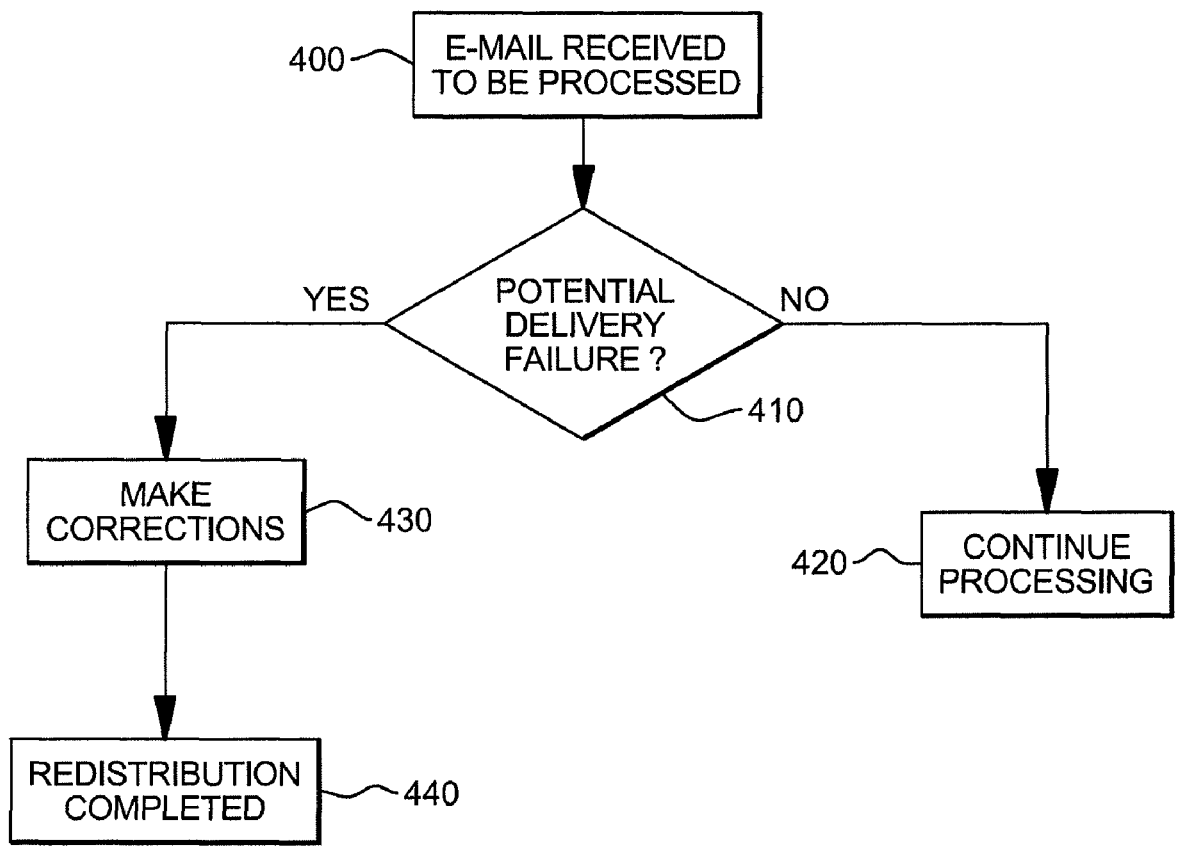
FIG. 4 depicts one example of the logic used to process an e-mail, in accordance with an aspect of the present invention.

FIG. 4 depicts one embodiment of the logic to process a communication, such as an e-mail. At STEP 400, the e-mail is received at the destination server and retrieved by the destination user's software (e.g., the user's Client software). The communications are generally catalogued or indexed using a variety of techniques, as known by those skilled in the art. In a commonly used technique, the cataloguing and/or indexing is performed using the globally unique message identification (message id) assigned to the e-mail at creation by the client. The globally unique message id is used to allow for the e-mail to be referenced for possible future update and/or reconciliation processing, as noted below.

Decision block 410 illustrates the situations and handling of a delivery failure condition. If there is no failure, then processing continues, STEP 420. However, if there is a failure, then a variety of different embodiments are possible. To facilitate understanding, an embodiment is discussed in which a "resend with propagation" option is used. In the event a delivery failure report is handled with a resend with propagation by the e-mail originator, the original e-mail is referenced to aggregate the redistribution target e-mails with the corrected (originally incorrect) e-mail information and the correction is then redistributed, as illustrated at STEPs 430 and 440. As discussed above, customization and automation of such process both or in combination are possible and a variety of embodiments can be provided during which correction is triggered at different stages of the process. Such processes may involve on one end of the spectrum, the possibility of sending the updates only, or at the other end, the possibility of resending the full e-mail content. Other embodiments fall somewhere in between.

Depending on the configuration preferences or policies at the receiving destination or e-mail server and client, the appropriate actions are then taken as previously indicated at 430. These actions can range from dynamically/automatically correcting the incorrect information without any awareness or intervention on the part of the user and or other recipients; or may be such as to provide full awareness. Either way, servers/clients at the destination are not effected, if they do not support the feature.

In one embodiment, header fields may be used to further accommodate the techniques discussed herein. There are various types of header fields, such as resent header fields, that can be used. Usually, header fields are not guaranteed to be in a particular order and can appear in any order. However, in one example, resent fields are not reordered and are kept in blocks prepended to the message.

Resent fields are used to identify a message as having been reintroduced into the transport system by a user and their purpose is to have the message appear to the final recipient as if it were sent directly by the original sender. A separate set of resent fields is added each time this is done. All of the resent fields corresponding to a particular resending of a message are lumped together. Each new set of resent fields is prepended to the message, such that the most recent set of resent fields appears earlier in the message. Each set of resent fields corresponds to a particular resending event, such that when a message is resent multiple times, each set of resent fields gives identifying information for each individual time.

There are different types of resent fields, such as, for example, the "Resent-Date:" field that corresponds to the "Date:" field and the "Resent-To:" field that corresponds to the "To:" field. In addition, there are two forms of originator fields associated with resent fields. The first is a "Resent-From:" form which contains the mailbox of the individual doing the resending. The second is identified in the "Resent-Sender:" field and resends a message on behalf of one or more others (identified in the "Resent-From:" field). When replying to a resent message, replies behave just as they would with any other message, using the original "From:","Reply-To:", "Message-ID:", and other fields. The "Resent-Date:" indicates the date and time at which the resent message is dispatched by the resender of the message. The "Resent-To:", "Resent-Cc:", and "Resent-Bcc:" fields function the same as the "To:", "Cc:", and "Bcc:" fields respectively, except that they indicate the recipients of the resent message, not the recipients of the original message. The "Resent-Message-ID:" field provides a unique identifier for the resent message.

One example of a corrective communication 500 with a resent header is depicted in FIG. 5. As shown, a Resent-From field 502, a Resent-To field 504, a Resent-Date field 506 and a Resent-Message-Id field 508 are provided in this particular example. Also, an X-Updated-Recipient field 510 is provided that identifies which recipient(s) address(es) are to be corrected and the correct e-mail address(es). The resent lines make the corrective note look like the reply note that was cascaded out. The X-Updated-Recipient line comes from the original originator's corrective note.

By capitalizing on some of the concepts provided by the resent header fields, an industry compliant heterogeneous solution is provided. This is further expanded on by also using additional headers, parameter fields, and propagation selection to yield a complete solution, as per one embodiment.

To facilitate an understanding of one or more aspects of the present invention, an example is described below. Assume a case where the client's preferences, or alternatively the present central site policy based configurations, are such that it enables the correction feature discussed earlier to process the correction automatically. In such a condition, when an e-mail is resent to a distribution of recipients, after detecting a delivery failure and (the originator) having corrected the address using the resent function discussed above, in one embodiment, the original note would be prepended with the resent header fields, such that it would cause a re-reference to the original note via the Message-Id field, so as to identify the original note being updated.

A new header line is then added that carries the original erroneous recipient and the associated (corrected) replacement e-mail address, which is normally coded as a key or type/pair. An example of this coding is as follows:
  Updated Recipient:
    badrecipients=<wronged@charter.net>,
    Correctrecipients=<righted@charter.net> or the like.
It should be noted that multiple corrections can be iterated within the same record(s).

In addition, the subject header line could be changed, depending on the particular embodiment, to prepend a string like "Updated Recipient", based on preference or policy. This is handled similar to various clients' handling of reply or forward functions, where the subject is automatically prepended (such as with "re"). This manner of handling the header line allows the users who do not have a visual User Agent to recognize that a recipient address has been changed, so they could manually correct the address. However, when a User Agent is used, they can be utilized to trigger an automatic searching of their mail store for that unique message-id so that when the recipient chooses a reply option, the User Agent could prompt the recipient with a window to correct the erroneous recipient string (or as noted earlier, used to handle it transparently without user intervention).

In accordance with an aspect of the present invention, the above technique is enhanced for use by a second tier (or later) of senders of the communication having an incorrect identity. That is, in the above-described technique, the originator of the communication is considered a first tier sender and the direct recipients are the first tier recipients. The first tier recipients are the receivers of the communication sent by the originator of the communication. The second tier (or later) senders are those that received the communication (i.e., the first tier (or later) recipients) and then send the communication in, for instance, a reply, reply all, forward, etc. to one or more recipients. Thus, the error is propagated by recipients of the original communication (or even later recipients).

This propagation is addressed by a capability that chases and corrects a previously sent and further propagated communication that includes one or more incorrect identities.

To illustrate the problem solved by this aspect of the present invention, consider the situation where the originator of a problematic e-mail (containing a bad identity) does not in a timely manner become aware of an undeliverable identity (e.g., e-mail address). For example, the originator goes on vacation shortly after having sent the e-mail containing an "undeliverable address", goes home for the weekend at the end of the work week, or is in a long meeting after sending the e-mail, etc. Before having returned to check his/her e-mail in-box and learning of the misdirected e-mail address through an undeliverable notification, one or more recipients have forwarded the note on, thus cascading the problem. For example, a user might send the e-mail to the distribution on Friday at 5 pm, turn off the computer and not return to see the "undeliverable message" in their in-box until Monday or some later day. Should a matter of hours or days go by, it's more than likely others will have fallen into the classic "reply all" or forwarding situation that inadvertently propagates the bad e-mail addresses. This is addressed by one or more aspects of the present invention, an embodiment of which is described with reference to FIGS. 6A-6B.

Figure 6A:
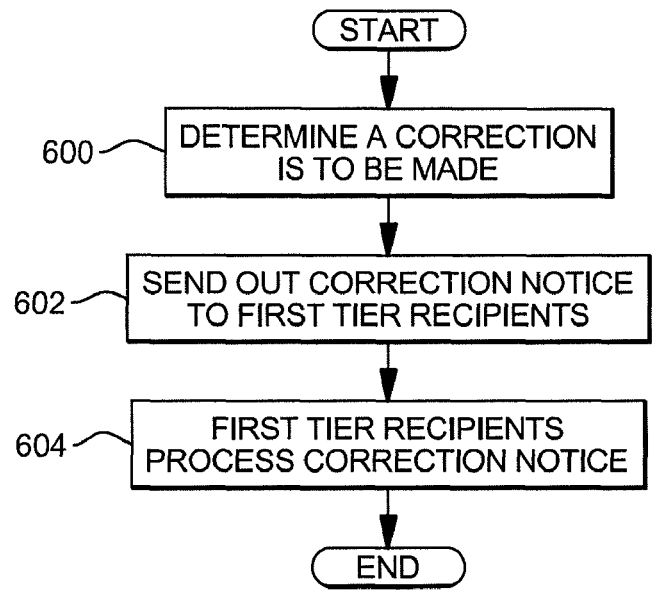
FIGS. 6A-6B depict one embodiment of the logic to chase propagated communications having incorrect identities and to notify recipients of the errors, in accordance with an aspect of the present invention.

Referring initially to FIG. 6A, on Monday morning (or at some other time), the originator opens his/her mail and sees that a Delivery Failure Notification has been received for the note that was sent out on Friday, STEP 600. Thus, as described above, the originator sends a corrective e-mail that has the corrected identities (e.g., e-mail address(es)) out to the original recipients, STEP 602. When one of the original recipients receives the e-mail correction notice, the recipient's User Agent (e.g., e-mail interface), in one embodiment, automatically (depending on configuration setting) processes the e-mail correction notice, STEP 604.

Figure 6B:
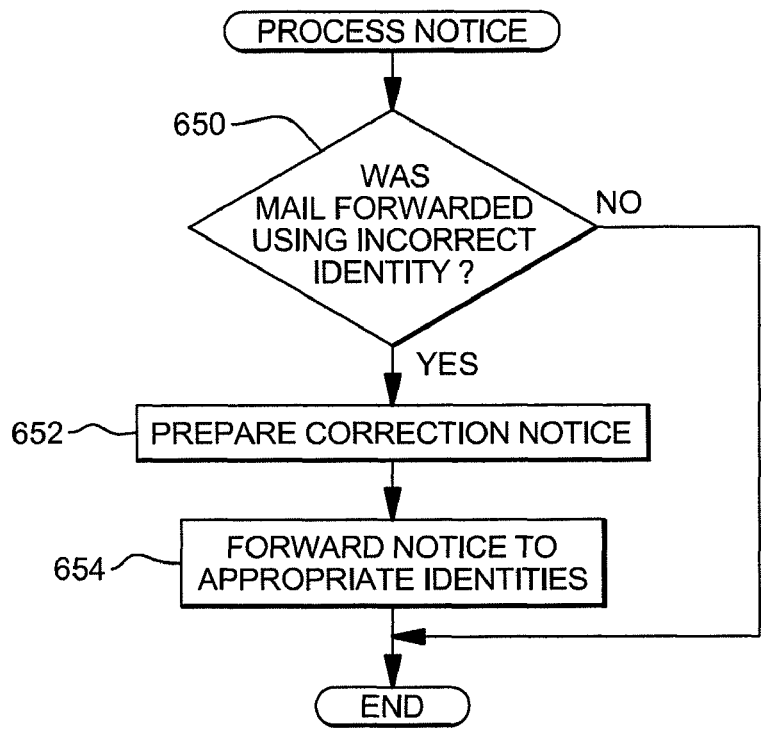

For instance, to automatically process the correction notice, the User Agent process searches it's database for the original unique message identifier (resent in the e-mail correction notice) to determine if there was any mail forwarded or replied to using that original message identifier, INQUIRY 650 (FIG. 6B). If not, processing is complete. However, if mail was forwarded using one or more incorrect identities, then the User Agent constructs another e-mail correction notice based on the forwarded/replied note (similar to the procedure described above), adding the updated recipient tag(s) from the original e-mail correction notice, STEP 652. This new notice includes the corrected identities. The User Agent also, as part of its correction process, compares the recipient lists of the original e-mail corrective notice (the one sent by the original originator) and the forwarded/replied note, and sends the notice to the recipients who are unique to the forwarded/replied note, STEP 654. This prevents recipients from receiving numerous corrective e-mail notices, should the original note have been forwarded numerous times.

In a further embodiment, should the recipient choose not to handle the e-mail correction notices automatically or if the configuration does not support automatic processing, a user prompt could be presented to the recipient informing the user that the note with incorrect identities had been forwarded/resent by the user on to others, and asking the user if the user wishes to process the e-mail correction notice and send out a secondary e-mail correction notice to the recipient(s) of the user's forwarded/resent note. This secondary correction notice includes the correct identity. In essence, the process would be the same, just the prompting for the user's action would be the difference between the two scenarios.

If a second tier recipient (recipient of the forwarded/resent note) or even a later tier recipient receives the e-mail correction notice, then the procedure would be the same as that of one of the original recipient(s). For instance, the second tier (or later) recipient may correct the identity and/or may determine whether the communication has been further propagated and take action, as described above. This action includes forwarding a corrective notice that includes the updated identities.

Described in detail above is one embodiment of detecting that a communication having one or more incorrect identities has been propagated, chasing the propagated communications and providing corrected identities. This allows corrective action to be taken. In one example, the detecting, chasing and providing are performed automatically, and optionally, are transparent to the second tier (or later) senders and/or recipients.

Information regarding taking corrective action by an original sender of a communication is described in U.S. Ser. No. 11/463,340, entitled "Source Initiated Autonomic Recipient E-Mail Address Correction Redistribution," Murphy et al., filed Aug. 9, 2006, which is hereby incorporated herein by reference in its entirety.

One or more aspects of the present invention can be included in an article of manufacture (e.g., one or more computer program products) having, for instance, non-transitory computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
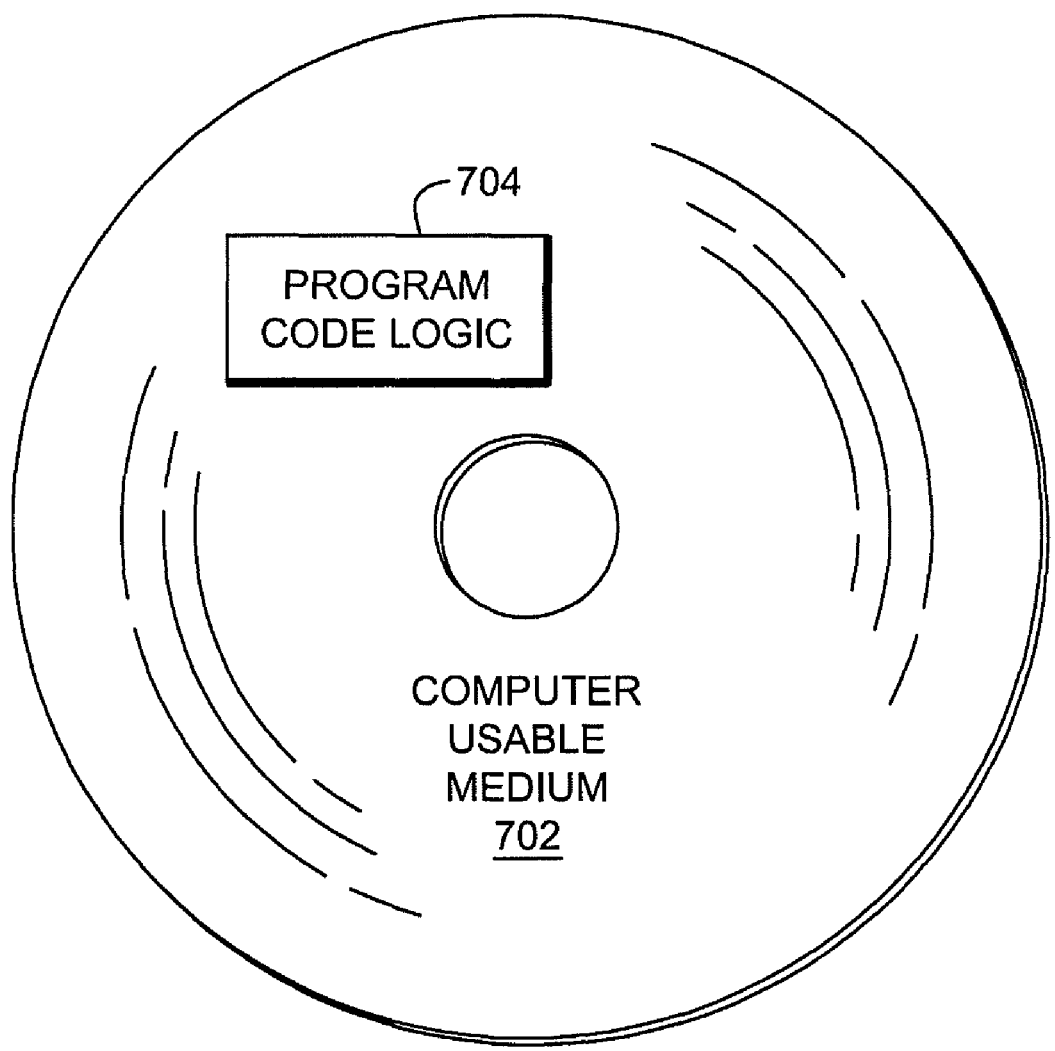
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more non-transitory computer readable media 702 to store computer readable program code means or logic 704 thereon to provide and facilitate one or more aspects of the present invention. The non-transitory medium can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided in which corrective action is taken to at least notify recipients of propagated communications that one or more identities included within those communications are incorrect and to provide correct identities.

Although various embodiments are described above, these are only examples. For example, the identity that is identified as being incorrect may be in the body of the message instead of the To:, cc:, or bcc: fields. Further, the communications that are described herein are just examples and many other communications may incorporate and use one or more aspects of the present invention. Further, although the examples described herein are for e-mail communications, the communications may be for other types of communication systems.

Further, as an example, the communications environment described above is only one example. There can be more or less communication units than described above. Also, the units can be different than that described above. As one particular example, the communications unit to send a communication may be a cell phone or other mobile device. Many other examples are also possible.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating correction of electronic communications, said method comprising:

receiving, by one or more primary recipients, an electronic communication sent from a sender of the electronic communication, the one or more primary recipients being other than the sender of the electronic communication, and the electronic communication having an incorrect identity associated therewith;

propagating, by a primary recipient of the one or more primary recipients, the received electronic communication to at least one secondary recipient, the at least one secondary recipient being other than the one or more primary recipients and other than the sender of the electronic communication;

receiving, by the primary recipient, a correction notice, the correction notice comprising a corrected identity for the incorrect identity associated with the electronic communication;

automatically processing the correction notice by the primary recipient, wherein the automatically processing comprises automatically determining by the primary recipient that the electronic communication was previously propagated by the primary recipient to the at least one secondary recipient; and automatically providing, by the primary recipient to the at least one secondary recipient, the corrected identity for the incorrect identity.

2. The computer-implemented method of claim 1, wherein the incorrect identity comprises an incorrect e-mail address.

3. The computer-implemented method of claim 1, wherein the providing comprises sending a correction notice to the at least one secondary recipient, the correction notice including the corrected identity.

4. The computer-implemented method of claim 1, wherein the providing comprises:
   determining the at least one secondary recipient to be provided the corrected identity, said determining taking into account whether the at least one secondary recipient has already been provided the corrected identity; and
   sending a correction notice to the at least one secondary recipient, the correction notice including the corrected identity.

5. The computer-implemented method of claim 1, wherein the determining that the electronic communication with the incorrect identity was previously propagated and the providing are performed automatically, in response to determining that the identity is incorrect.

6. The computer-implemented method of claim 5, wherein the determining that the identity is incorrect comprises receiving a delivery failure notification indicating the incorrect identity.

7. The computer-implemented method of claim 1, wherein the primary recipient comprises a first tier recipient, said first tier recipient receiving the electronic communication from an originator of the electronic communication.

8. The computer-implemented method of claim 1, wherein the primary recipient comprises an N tier recipient, wherein N is greater than 1, wherein said N tier recipient receives the correction notice from an N−1 tier recipient, and wherein the providing comprises providing by the N tier recipient a correction notice to an N+1 tier recipient, wherein the N+1 tier recipient is one recipient of the at least one secondary recipient to which the N tier recipient propagated the electronic communication.

9. A system of facilitating correction of electronic communications, said system comprising:
   at least one communications unit to perform:
      receiving, by one or more primary recipients, an electronic communication sent from a sender of the electronic communication, the one or more primary recipients being other than the sender of the electronic communication, and the electronic communication having an incorrect identity associated therewith;
      propagating, by a primary recipient of the one or more primary recipients, the received electronic communication to at least one secondary recipient, the at least one secondary recipient being other than the one or more primary recipients and other than the sender of the electronic communication;
      receiving, by the primary recipient, a correction notice, the correction notice comprising a corrected identity for the incorrect identity associated with the electronic communication;
      automatically processing the correction notice by the primary recipient, wherein the automatically processing comprises automatically determining by the primary recipient that the electronic communication was previously propagated by the primary recipient to the at least one secondary recipient; and
      automatically providing, by the primary recipient to the at least one secondary recipient, the corrected identity for the incorrect identity.

10. The system of claim 9, wherein the providing comprises sending a correction notice to the at least one secondary recipient, said correction notice including the corrected identity.

11. The system of claim 9, wherein the providing comprises:
   determining the at least one secondary recipient to be provided the corrected identity, said determining taking into account whether the at least one secondary recipient has already been provided the corrected identity; and
   sending a correction notice to the at least one secondary recipient, the correction notice including the corrected identity.

12. The system of claim 9, wherein the determining that the electronic communication with the incorrect identity was previously propagated and the providing are performed automatically, in response to determining that the identity is incorrect.

13. The system of claim 9, wherein the primary recipient comprises an N tier recipient, wherein N is greater than 1, wherein said N tier recipient receives the correction notice from an N−1 tier recipient, and wherein the providing comprises providing by the N tier recipient a correction notice to an N+1 tier recipient, wherein the N+1 tier recipient is one recipient of the at least one secondary recipient to which the N tier recipient propagated the electronic communication.

14. An article of manufacture comprising:
   at least one non-transitory computer readable medium having computer readable program code logic to facilitate correction of electronic communications, said computer readable program code logic when executing performing the following:
      receiving, by one or more primary recipients, an electronic communication sent from a sender of the electronic communication, the one or more primary recipients being other than the sender of the electronic communication, and the electronic communication having an incorrect identity associated therewith;
      propagating, by a primary recipient of the one or more primary recipients, the received electronic communication to at least one secondary recipient, the at least one secondary recipient being other than the one or more primary recipients and other than the sender of the electronic communication;

receiving, by the primary recipient, a correction notice, the correction notice comprising a corrected identity for the incorrect identity associated with the electronic communication;

automatically processing the correction notice by the primary recipient, wherein the automatically processing comprises automatically determining by the primary recipient that the electronic communication was previously propagated by the primary recipient to the at least one secondary recipient; and automatically providing, by the primary recipient to the at least one secondary recipient, the corrected identity for the incorrect identity.

15. The article of manufacture of claim 14, wherein the providing comprises sending a correction notice to the at least one secondary recipient, the correction notice including the corrected identity.

16. The article of manufacture of claim 14, wherein the providing comprise:

determining the at least one secondary recipient to be provided the corrected identity, said determining taking into account whether the at least one secondary recipient has already been provided the corrected identity; and sending a correction notice to the at least one secondary recipient, the correction notice including the corrected identity.

17. The article of manufacture of claim 14, wherein the determining that the electronic communication with the incorrect identity was previously propagated and the providing are performed automatically, in response to determining that the identity is incorrect.

18. The article of manufacture of claim 14, wherein the primary recipient comprises an N tier recipient, wherein N is greater than 1, wherein said N tier recipient receives the correction notice from an N−1 tier recipient, and wherein the providing comprises providing by the N tier recipient a correction notice to an N+1 tier recipient, wherein the N+1 tier recipient is one recipient of the at least one secondary recipient to which the N tier recipient propagated the electronic communication.

* * * * *